Sept. 23, 1969  H. BERGESEN ET AL  3,468,000
PACKING TOOL FOR MAKING CHANNELED CONCRETE BODIES
Original Filed May 26, 1966  3 Sheets-Sheet 1

Fig. I

Howard Bergesen
Innis O'Rourke, Jr.
INVENTORS.

BY Karl G. Ross

Attorney

Howard Bergesen
Innis O'Rourke, Jr.
INVENTORS.

BY Karl G. Ross

Attorney

Howard Bergesen
Innis O'Rourke, Jr.
INVENTORS.

BY Karl G. Ross

Attorney

United States Patent Office 3,468,000
Patented Sept. 23, 1969

3,468,000
PACKING TOOL FOR MAKING CHANNELED
CONCRETE BODIES
Howard Bergesen, Valley Stream, and Innis O'Rourke, Jr.,
Upper Brookville, N.Y.
Original application May 26, 1966, Ser. No. 553,146.
Divided and this application Mar. 21, 1968, Ser.
No. 734,509
Int. Cl. B28b 1/44
U.S. Cl. 25—1                                   2 Claims

ABSTRACT OF THE DISCLOSURE

A packing tool for making concrete conduit which has a cylindrical troweling head at the end of its shaft. A plurality of interleaved helical blades of like pitch on the shaft immediately adjoining the head define helical flutes. A transverse surface of the head confronts the blades and has a like number of recesses, each communicating with the respective flute, and is flared outwardly into the periphery of the head with a helicoidal pitch substantially corresponding to that of the blades.

---

This application is a division of application No. 553,146, filed May 26, 1966.

Our present invention relates to a method of and apparatus for making concrete ducts in the general manner disclosed in commonly assigned U.S. Patents Nos. 2,143,-448, 2,143,449 and 2,148,873 issued to Innis O'Rourke, Jr. More particularly, it relates to the manufacture of bent pipe sections of the type described in our prior U.S. Patent No. 3,038,231 wherein a concrete shell is curved in a plane and is traversed by one or more arcuate bores with a common axis of curvature.

In the last-mentioned patent we have disclosed and claimed a system wherein a mold support, such as a turntable or an oscillatable platform, is displaced in timed relationship with a linear (e.g. descending and ascending) motion of a packing tool so that the tool and the mold carry out a relative motion along a curved line to form an arcuate channel in a mass of concrete composition poured into the mold. Such a system is quite practical as long as the ducts to be manufactured are all of the same size and curvature; the relatively intricate coupling required between the means for displacing the tool and the mold support is, however, difficult to adjust to enable the production of different shapes.

It is, therefore, the general object of our present invention to provide an improved packing tool for the formation of arcuate channels with various radii of curvature.

A plant for the production of curved concrete ducts in accordance with the present improvement is described in application Ser. No. 553,146 and comprises a carrier member, such as an elongated boom, swingable about a substantially horizontal axis and carrying one or more generally vertical shafts each with a packing tool at a location remote from that axis, the number of shafts and tools corresponding to the number of channels to be formed simultaneously in a concrete body or bodies to be molded. Each shaft should be long enough to enable endwise introduction of its tool, conveniently from above, into a mold provided for this purpose with an open end. After the mold has been filled with concrete composition, in the general manner taught in the above-identified prior patents, the packing tool is arcuately displaced in the mold cavity by a swinging of its carrier member on the axis thereof so that a channel curved about that axis is formed within the concrete mass which is concurrently compacted by the tool, between the latter and the mold wall, along the periphery of the channel.

The swingable carrier member, particularly if designed as a boom, may be fitted with a plurality of journal pins or gudgeons, spaced apart in longitudinal direction of the boom, which may be alternately supported in suitable bearings on a base for allowing changes in the radius of channel curvature by selectively swinging the carrier member about one or the other of the fulcra so constituted.

According to another features of our invention, the mold support is mounted on an intermittently rotatable turntable carrying it in succession through a molding station for the formation of a channeled body as described above, a reaming station for the finishing of the terminations of the duct, and a removal station where the mold support can be swung into a substantially horizontal position before the mold is opened to enable the formed duct to be lifted out. The ends of the molded body may be defined, in a manner generally disclosed in the aforementioned U.S. Patent No. 2,143,449, by so-called top and/or bottom hats which are apertured to enable the passage of respective reaming implements, e.g. at the aforementioned reaming station located between the molding and removal stations, and which advantageously are pivotally secured to the mold proper for outward swinging about axes offset from the centerline of the mold in the direction of the center of curvature of the mold cavity, this pivotal mounting facilitating the removal of the hats from the extremities of the arcuate mold body.

Another feature of our invention, designed to enhance the compacting of the duct wall by the receding packing tool, resides in a construction of this tool as a combination of a generally cylindrical troweling head at the end of its shaft and one or more helical blades or wings on the shaft immediately adjoining this head, the blades defining one or more helical flutes (two such flutes being formed, preferably, by two interleaved blades of like pitch spaced 180° apart) which communicate with respective recesses in a confronting transverse surface of the head; each of these recesses is faired laterally outwardly, with a helicoidal pitch substantially corresponding to that of the blades, into the periphery of the head so as to form a progressively shallower trailing portion (as viewed in the direction of shaft rotation) which distributes the oncoming concrete material onto the channel wall and compacts it as the head recedes from its position of deepest penetration. For the forming of curved channels this head should be suitably barrel-shaped, yet the same type of recess may also be used on exactly cylindrical heads designed for producing straight bores. The maximum diameter of the head should, in any event, be slightly smaller than the outer diameter of the helical blade or blades.

Our invention will be described in greater detail with reference to the accompanying drawing in which.

Figure 1:
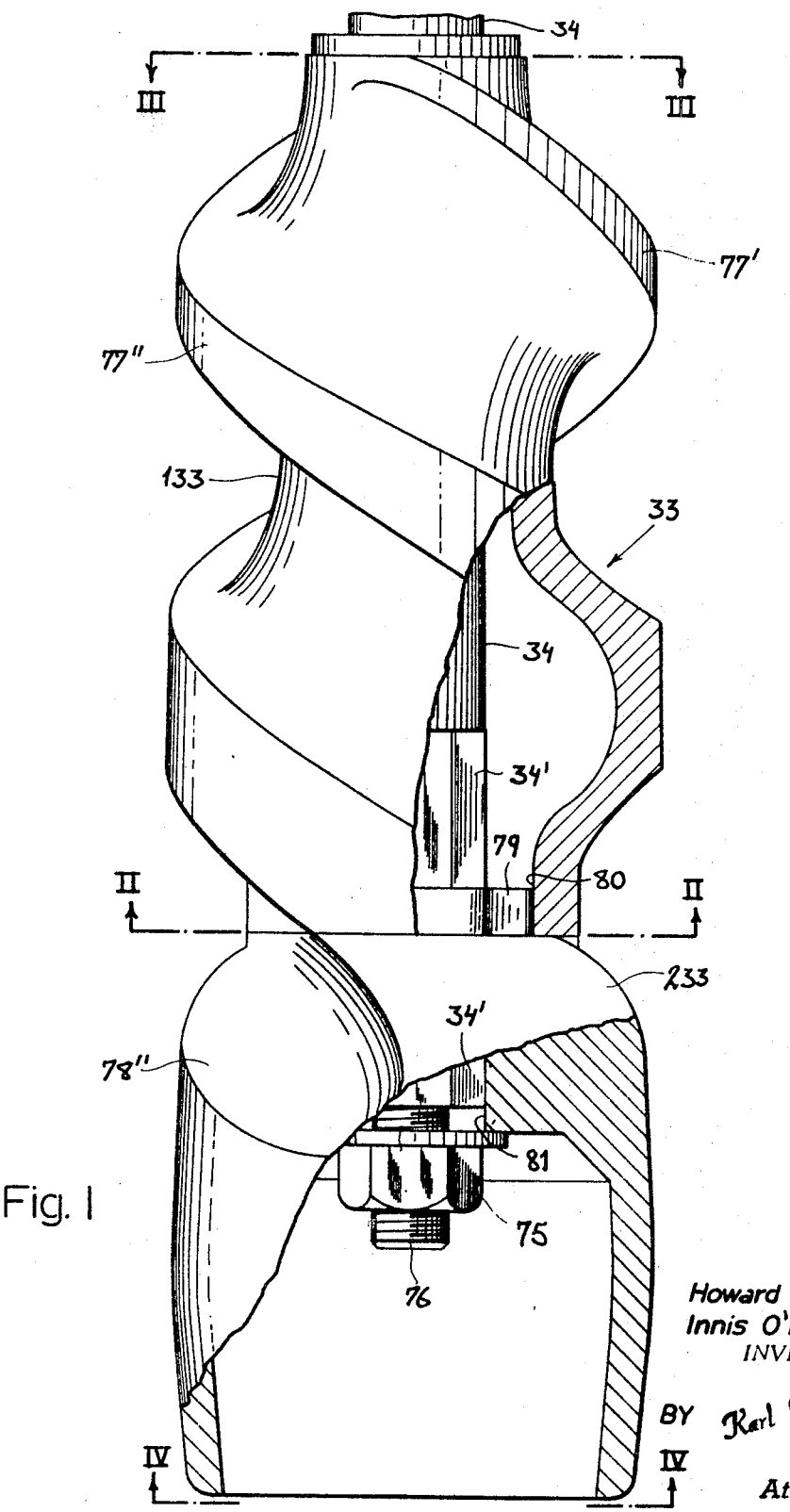
FIG. 1 is elevational view (parts broken away) of a packing tool forming part of an apparatus for making curved ducts as described in application Ser. No. 553,146.
Figure 2:
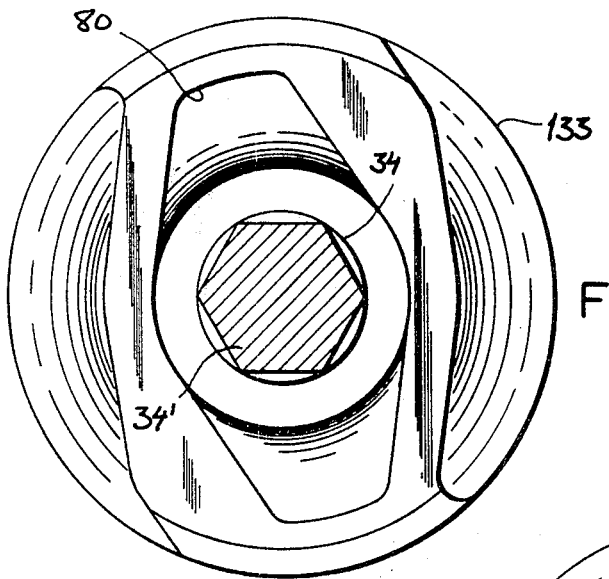
FIG. 2 is a bottom view of a blade carrier forming part of this tool, taken on the line II—II of FIG. 1.
Figure 3:
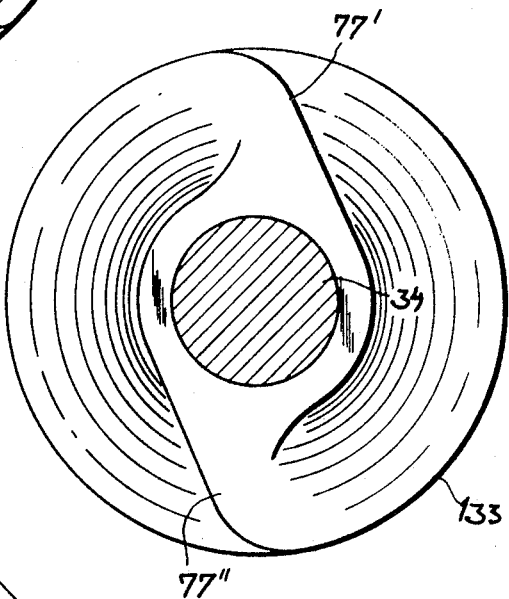
FIG. 3 is a top view of the blade carrier, taken on the line III—III of FIG. 1.
Figure 4:
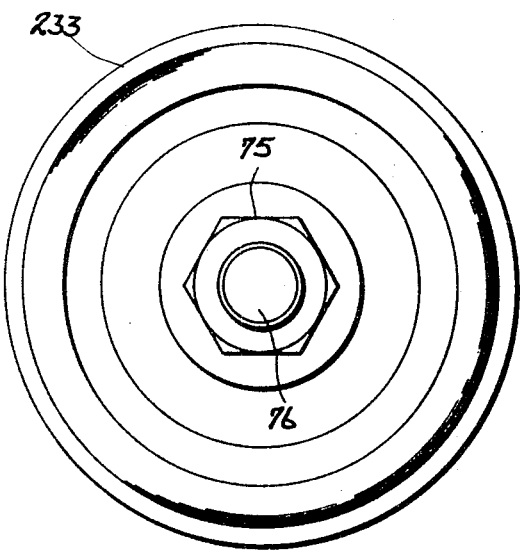
FIG. 4 is a bottom view of a troweling head forming part of the tool, taken on the line IV—IV of FIG. 1.
Figure 6:
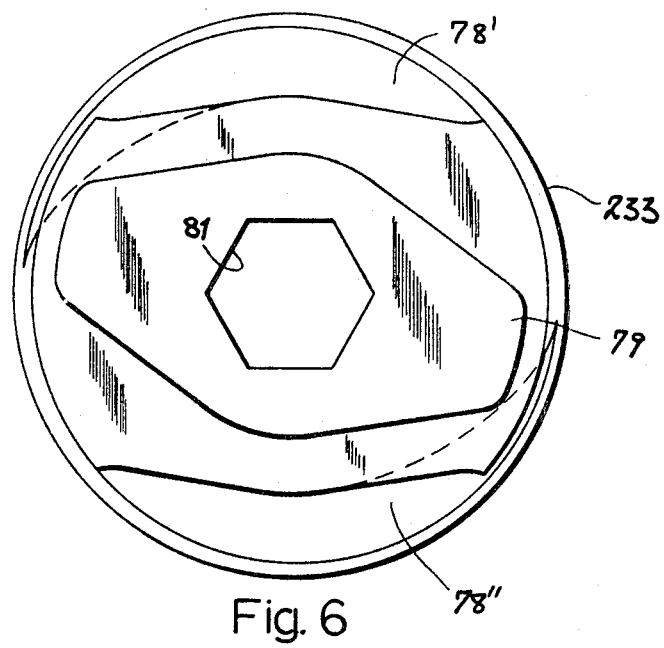
FIG. 6 is a top view of the troweling head, taken on the line VI—VI of FIG. 5.
Figure 5:
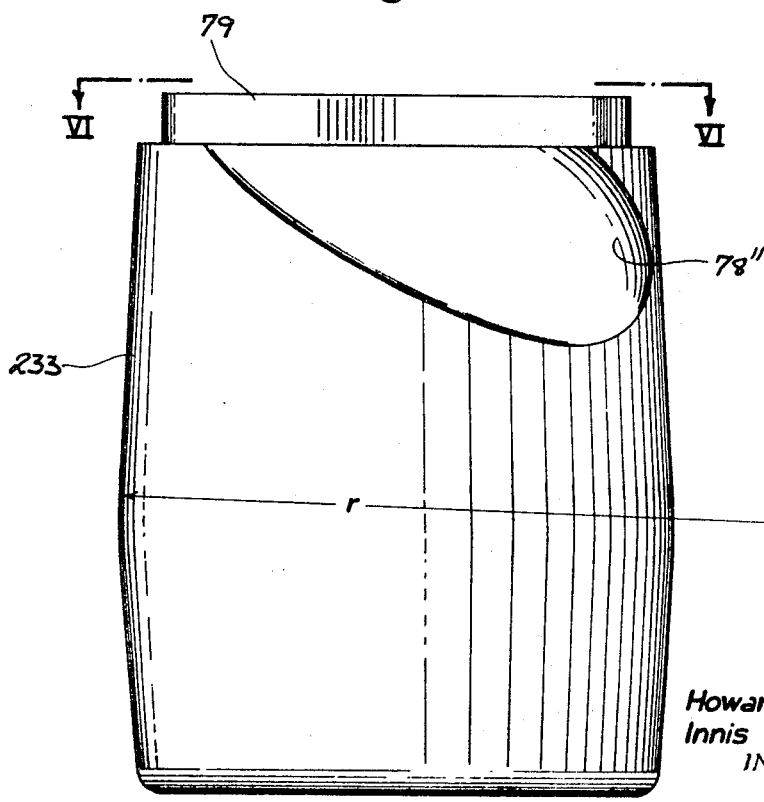
FIG. 5 is a side view of the troweling head, taken at right angles to the view of FIG. 1.

In FIGS. 1–6 we show a detailed description of the shaping and compacting tool 33 for use in the plant described in application Ser. No. 553,146. As shown in FIG. 1, the tool comprises an upper part or cutter 133 detachably secured to a slightly barrel-shaped but generally cylindrical lower part or troweling head 233 by means of a nut 75 engaging a threaded extension 76 on the hexagonally profiled lower end 34' of shaft 34. The cutter 133 carries two diametrically opposite helical ribs or blades 77', 77" which cut into the loose concrete mass above the tool 33 as the latter ascends during the shaping stroke. Rotating in the direction of the arrows shown in FIGS. 3 and 4, thus clockwise when viewed from above, the blades 77', 77" compact the concrete downwardly and channel it into a pair of adjoining peripheral recesses 78', 78" which are formed on the head 233 and aligned with the blades so as to register with the helicoidal flutes or grooves formed therebetween. The recesses 78', 78" have substantially the same pitch as the flutes and blades and, as shown in dotted lines in FIG. 6, are flared laterally into the outer periphery of the head 233, thereby camming the compacted mass outwardly into the wall of the workpiece channel which is then smoothed by the solid bottom portion of head 233. A noncircular neck 79 at the top of head 233, fitting into a corresponding recess 80 on the underside of cutter 133, has a hexagonal bore 81 matingly receiving the profiled end 34' of shaft 34. This insures exact alignment of the tool portions 133 and 233 upon their assembly on the shaft 34.

The radius of curvature $r$ of the generatrices of the barrel-shaped head 233 should be equal to or slightly less than the swing radius $R$ of the tool as defined by its distances from the axis of gudgeons 38. If these gudgeons are shifted to another location along the groove 35, a tool head of suitably reduced radius of curvature $r$ should be used.

The arrangement described and illustrated is, of course, capable of numerous modifications without departing from the spirit and scope of our invention as defined in the appended claims.

We claim:
1. A packing tool for the forming of a channeled concrete body, comprising an elongated shaft, a generally cylindrical troweling head at an end of said shaft, and a plurality of interleaved helical blades of like pitch on said shaft immediately adjoining said head, said blades defining a plurality of helical flutes between them, said head having a transverse surface which confronts said blades and is provided with a like plurality of recesses each communicating with a respective flute and being flared laterally outwardly into the periphery of said head with a helicoidal pitch substantially corresponding to that of said blades.

2. A tool as defined in claim 1 wherein said head is barrel-shaped with a maximum diameter smaller than the outer diameter of each helical blade.

References Cited
UNITED STATES PATENTS

| 52,632 | 2/1866 | Whittlesey | 175—394 |
| 2,143,448 | 1/1939 | O'Rourke | 25—36 |
| 2,612,672 | 10/1952 | Rifenburg | 25—36 |

FOREIGN PATENTS

| 141,821 | 11/1930 | Switzerland. | |

J. SPENCER OVERHOLSER, Primary Examiner

ROBERT D. BALDWIN, Assistant Examiner

U.S. Cl. X.R.

25—36